G. ATTERBURY.
COLLAPSIBLE CORE FOR MOLDING OR CASTING.
APPLICATION FILED NOV. 12, 1909.
1,042,749.
Patented Oct. 29, 1912.
3 SHEETS—SHEET 1.
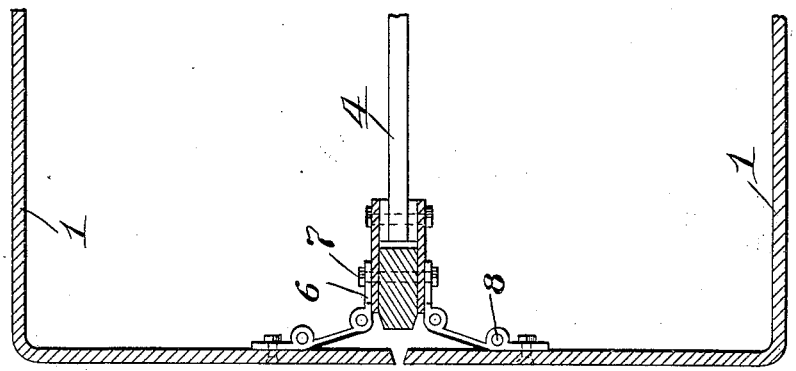
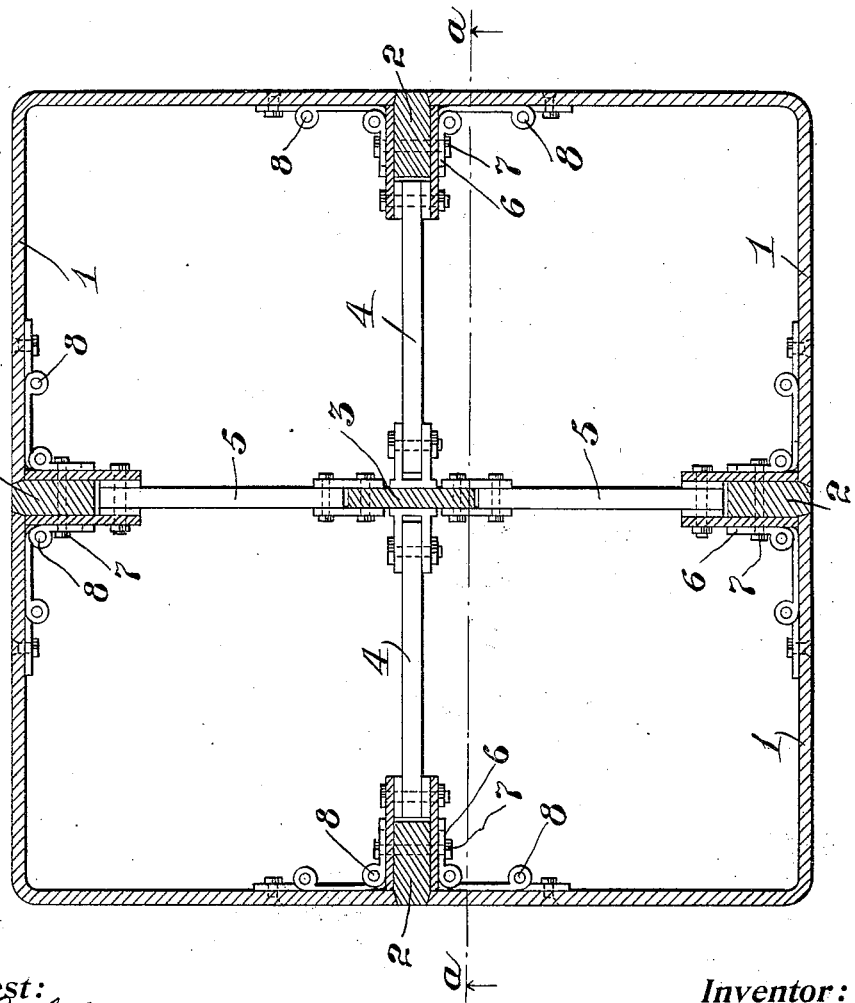
Attest:
C. F. Ashley
C. O. Mitchell
Inventor:
Grosvenor Atterbury
by Betts Sheffield Bentley Betts
Atty

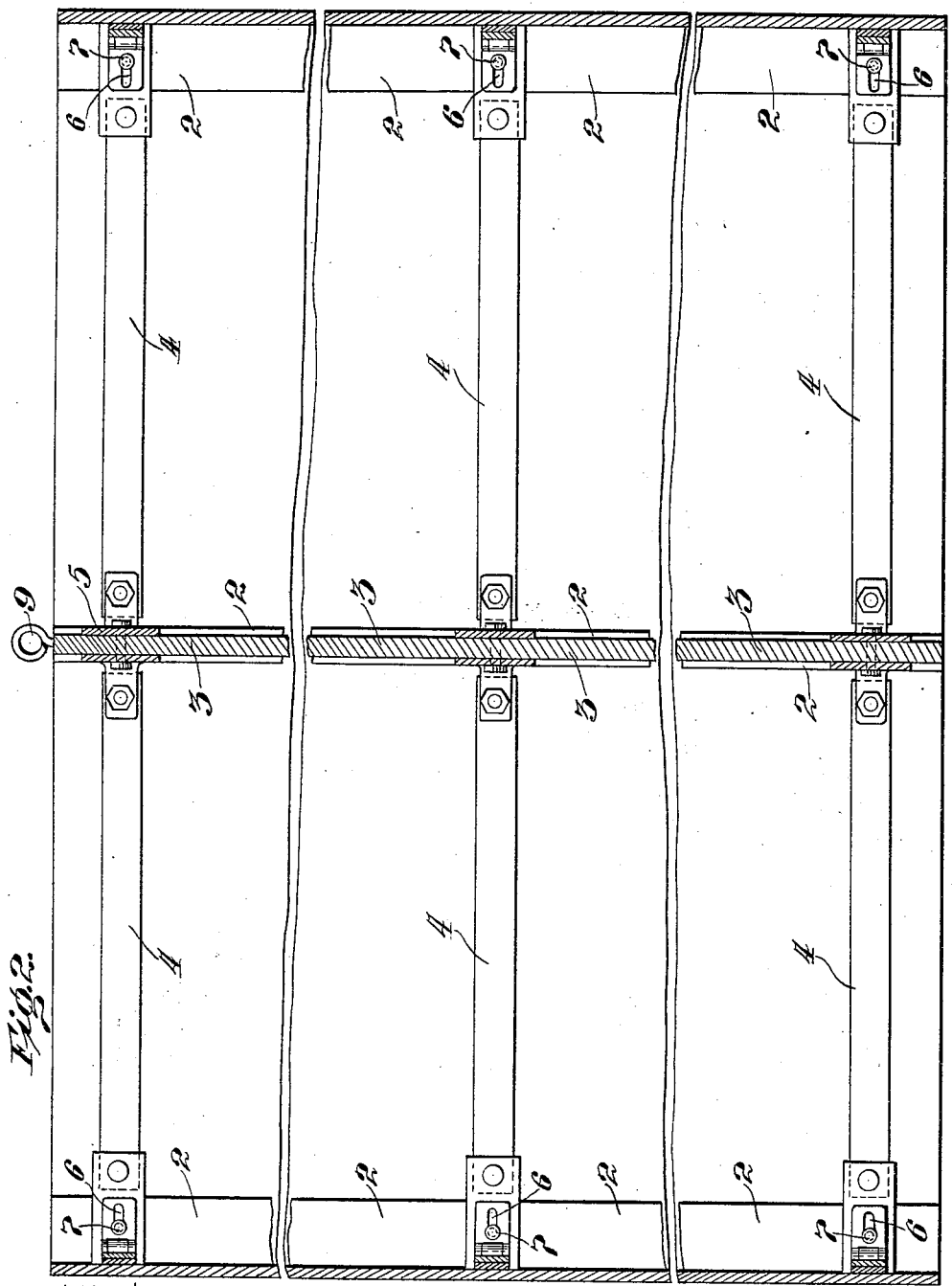

G. ATTERBURY.
COLLAPSIBLE CORE FOR MOLDING OR CASTING.
APPLICATION FILED NOV. 12, 1909.
1,042,749.
Patented Oct. 29, 1912.
3 SHEETS—SHEET 3.
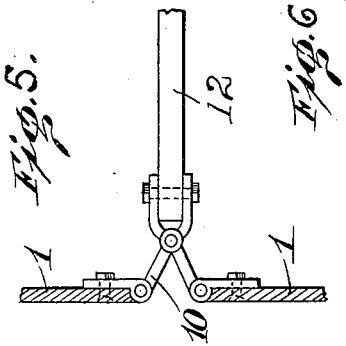
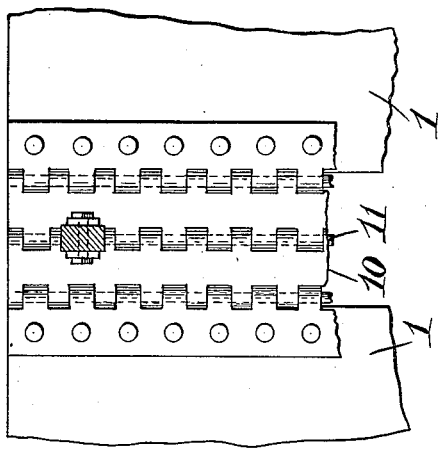
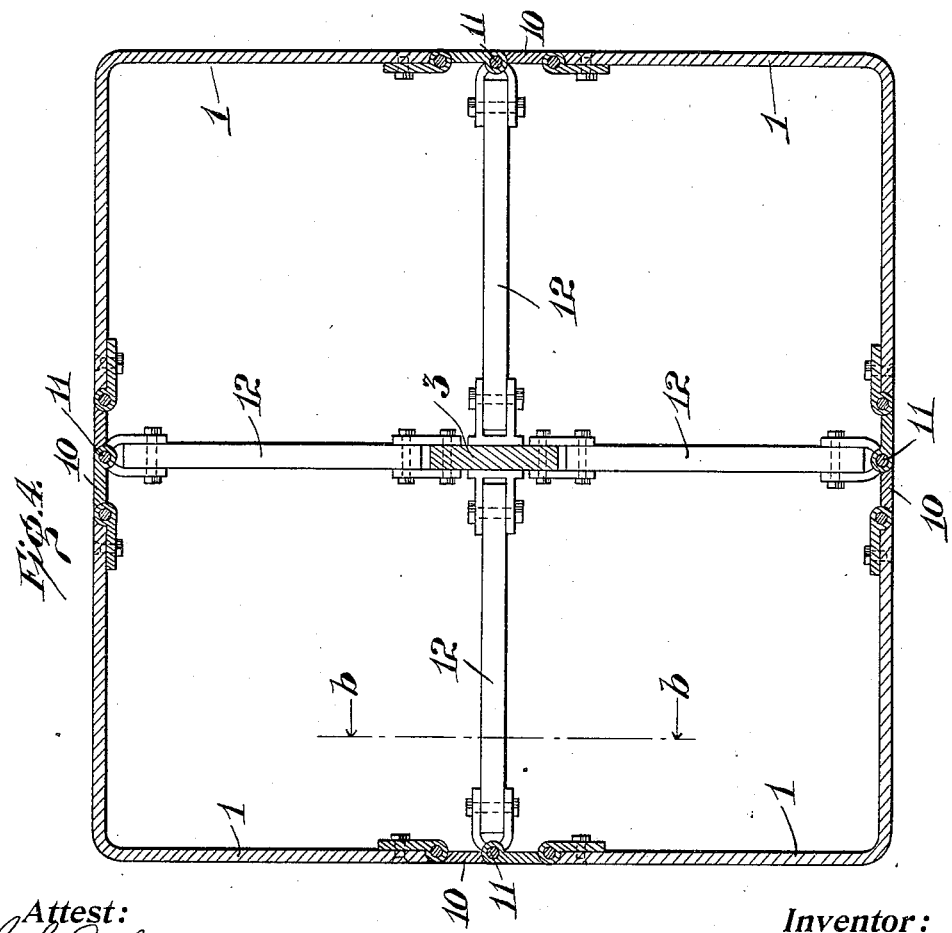
Attest:
C. L. Ashley
E. D. Mitchell
Inventor:
Grosvenor Atterbury
by Betts Sheffield Bentley Betts
Atty

UNITED STATES PATENT OFFICE.

GROSVENOR ATTERBURY, OF NEW YORK, N. Y.

COLLAPSIBLE CORE FOR MOLDING OR CASTING.

1,042,749. Specification of Letters Patent. Patented Oct. 29, 1912.

Application filed November 12, 1909. Serial No. 527,717.

*To all whom it may concern:*

Be it known that I, GROSVENOR ATTERBURY, a citizen of the United States, and resident of the borough of Manhattan, city, county, and State of New York, have invented certain new and useful Improvements in Collapsible Cores for Molding or Casting, of which the following is a clear and complete disclosure.

My invention relates to that class of molding apparatus in which the body or block is cast with a central hole, or holes, formed by means of a suitable core, or cores, adapted to be withdrawn after the block is formed and has sufficiently hardened to maintain its shape.

The object of my invention is to produce a core light, simple and cheap in construction, which shall be reasonably durable and may be easily withdrawn from the block, even when the block is of unusual length, without damaging the block or displacing the material.

Further features, advantages and benefits of my invention will be apparent from the following specification and the accompanying drawings, forming a part thereof, in which—

Figure 1 is a horizontal sectional view of one form of my improved core; Fig. 2 is an enlarged vertical section taken on the line *a—a* of the core shown in Fig. 1; Fig. 3 is a detail view of the core shown in Fig. 1 and shows the filler piece withdrawn and the walls of the core drawn in or contracted. Fig. 4 is a horizontal sectional view of a modified core in which the filler pieces are omitted. Fig. 5 is a detail view of the hinge joints connecting the side plates of the structure shown in Fig. 4. Fig. 6 is a sectional view on line *b—b* of Fig. 4.

Referring in detail to the drawings illustrating the modification shown in Figs. 1, 2 and 3, 1 designates the side walls, or forming plates of the core. There are four of these and between their adjacent edges there are placed filler blocks or pieces 2. These pieces serve to close the joints between the sections or forming plates, constituting the wall of the core and may be withdrawn as hereinafter pointed out, in order to allow the forming plates to be drawn inwardly so as to collapse or contract the core. An upright 3 is centrally disposed or placed in the core and connected to this upright 3 are arms 4 and 5, extending and connected to the filler pieces placed at the sides of the core. The members 4 and 5 are pivoted at each end so as to permit the center piece to move longitudinally. The arrangement is such that if the center piece 3 be displaced longitudinally, either by raising or lowering it, the first result will be the withdrawing of the filler pieces 2. This is accomplished by connecting the arms 4 and 5 to the filler pieces directly and to the side walls, or forming plates 1 by a lost motion arrangement, which takes the form of slots 6, in which are disposed the bolts 7. When the member 3 is raised or lowered, the filler pieces 2 are first withdrawn because they are rigidly connected to the arms 4 and 5 and the sides move later because of the slots 6. As soon as the bolts 7 reach the ends of the slots 6 the hinges 8 come into action and draw the ends of the forming plates together inwardly, as shown in Fig. 3, thus contracting the core. Only a slight movement is necessary to withdraw the filler pieces, and in some cases there will be sufficient lost motion to permit their withdrawal without the slot 6. For expanding the core the member 3 is brought to its normal position. This forces the ends of the sides away from one another, and inserts the filler pieces as shown in Fig. 1.

In Figs. 4, 5 and 6, the forming plates or sides 1 are joined by hinges 10 connected at their center joint 11 to arms 12, which extend and are secured to a common center piece 3. The arms 12 are pivoted at both ends, and the arrangement is such that the center piece may be moved longitudinally to thrust out or draw in the arms 12. When the arms 12 are thrust out the hinges 10, which extend the full length of the core, are extended straight and form a part of the side walls of the core as shown in Fig. 4. When the arms 12 are drawn in, they close the hinges as shown in Fig. 5, drawing the forming plates toward the center piece 3, and thus reducing the size of the core so that it can be readily withdrawn from the block or casting. For the purpose of withdrawing my core from the block, I may provide a ring 9 at the top of the center piece 3. If the core be lifted by means of this ring the first result will be to contract the core so that it can be easily withdrawn from the block.

In the drawings I have illustrated a square core with the arms for pulling in the side or forming plates of equal length. Should the mold be other than square or round, the arms can readily be equalized as to length by extending the rigid projections attached to the center piece and to which the arms are pivoted or the shorter arms may be extended by pivoting them on the farther side of the center piece.

While I have illustrated a core rectangular in form and composed of four side members, or forming plates, it is obvious that the shape of the core may be varied at will, as may also the number of the side members, or forming plates, which may be only two in number, or increased to any desired number.

I am aware that other modifications of my core may be made by those skilled in the art without departing from the spirit or scope of my invention, and I desire to secure protection for all such modifications as come within the scope of my claims.

What I claim is:

1. In a core, a plurality of retractable forming plates, a plurality of filler pieces disposed between them, operating members having a pivoted connection with said filler pieces and a lost motion connection with said plates and adapted when thrust out to expand the core and insert the filler pieces and when pulled in to withdraw the filler pieces and contract the core, substantially as described.

2. In a core a plurality of retractable forming plates, a plurality of filler pieces disposed between them, operating members having a pivoted connection with said filler pieces, and hinges connected at one end to the forming plates and at the other end to the filler pieces, substantially as described.

Dated November 1, 1909.

GROSVENOR ATTERBURY.

Witnesses:
 WALTER S. JONES,
 JOHN W. PETERS.

---

Copies of this patent may be obtained for five cents each, by addressing the "Commissioner of Patents, Washington, D. C."